US009933255B2

(12) United States Patent
Beuth, Jr.

(10) Patent No.: US 9,933,255 B2
(45) Date of Patent: Apr. 3, 2018

(54) PROCESS MAPPING OF MELT POOL GEOMETRY

(75) Inventor: Jack Lee Beuth, Jr., Pittsburgh, PA (US)

(73) Assignee: Carnegie Mellon University, Pittsburgh, PA (US)

(*) Notice: Subject to any disclaimer, the term of this patent is extended or adjusted under 35 U.S.C. 154(b) by 1024 days.

(21) Appl. No.: 14/235,664

(22) PCT Filed: Jul. 27, 2012

(86) PCT No.: PCT/US2012/048658
§ 371 (c)(1),
(2), (4) Date: May 2, 2014

(87) PCT Pub. No.: WO2013/019663
PCT Pub. Date: Feb. 7, 2013

(65) Prior Publication Data
US 2014/0249773 A1    Sep. 4, 2014

Related U.S. Application Data

(60) Provisional application No. 61/574,253, filed on Jul. 29, 2011.

(51) Int. Cl.
*G01B 21/28* (2006.01)
*G01B 21/00* (2006.01)
(Continued)

(52) U.S. Cl.
CPC ........... *G01B 21/00* (2013.01); *B29C 37/005* (2013.01); *B29C 64/106* (2017.08); *B29C 64/20* (2017.08); *B29C 2037/90* (2013.01)

(58) Field of Classification Search
CPC ............... G01N 29/11; G01N 29/2468; G01N 2291/044; G01B 21/28; B29C 2037/90; B29C 37/005
(Continued)

(56) References Cited

U.S. PATENT DOCUMENTS 6,143,378 A     11/2000 Harwell et al.
6,813,533 B1 *  11/2004 Semak .................. B23K 26/34
                                            148/97

(Continued)

FOREIGN PATENT DOCUMENTS

WO    WO2013019663    2/2013

OTHER PUBLICATIONS

International Search Report for corresponding Application No. PCT/US2012/048658, dated Feb. 18, 2013; pp. 1-9.
(Continued)

*Primary Examiner* — Mohamed Charioui
(74) *Attorney, Agent, or Firm* — Fish & Richardson P.C.

(57) ABSTRACT

Conducting a plurality of tests of a manufacturing process, with each test conducted at a different combination of a first process variable and a second process variable. Each test includes locally heating a region of a part, wherein the local heating results in the formation of a thermal field in the part, and assessing a dimension of the thermal field. In some cases, based on the results of the plurality of tests, a process map of the dimension of the thermal field is generated as a function of the first process variable and the second process variable.

30 Claims, 15 Drawing Sheets

(51) Int. Cl.
    *B29C 37/00*       (2006.01)
    *B29C 64/106*     (2017.01)
    *B29C 64/20*      (2017.01)

(58) Field of Classification Search
    USPC .......................................................... 702/155
    See application file for complete search history.

(56) References Cited

U.S. PATENT DOCUMENTS

| | | |
|---|---|---|
| 6,850,862 B1 | 2/2005 | Chidichimo et al. |
| 7,073,561 B1 | 7/2006 | Henn |
| 7,704,565 B2 | 4/2010 | Slaughter |
| 7,777,155 B2 | 8/2010 | Twelves, Jr. et al. |
| 7,917,243 B2 | 3/2011 | Kozlak et al. |
| 2006/0222043 A1 | 10/2006 | Cahill |
| 2008/0082288 A1 | 4/2008 | Raad |
| 2008/0296270 A1 | 12/2008 | Song et al. |
| 2011/0061591 A1 | 3/2011 | Stecker |
| 2011/0114839 A1 | 5/2011 | Stecker et al. |

OTHER PUBLICATIONS

Vasinonta et al., "Process Maps for Controlling Residual Stress and Melt Pool Size in Laser-Based SFF Processes. In: Solid Freeform Fabrication Proceedings.," The University of Texas at Austin, pp. 200-208 (2000).

* cited by examiner

PROCESS MAPPING OF MELT POOL GEOMETRY

CROSS-REFERENCE TO RELATED APPLICATIONS

This application is the U.S. national phase application under 35 USC § 371 of International Application Number PCT/US2012/048658, filed on 27 Jul. 2012, which claims priority to U.S. Patent Application Ser. No. 61/574,253, filed on Jul. 29, 2011, the entire contents of both of which are hereby incorporated by reference.

STATEMENT OF GOVERNMENT INTEREST

This work was supported by the National Science Foundation under Grant CMMI-0700538 a. The government has certain rights in the invention.

FIELD OF THE INVENTION

This invention relates to process mapping, e.g., for manufacturing processes such as additive manufacturing.

BACKGROUND

Additive manufacturing (AM), also known as direct digital manufacturing, refers to a wide range of processes for the direct fabrication of final parts and/or functional prototypes using rapid prototyping technology. In AM, parts are fabricated by deposition using a heat source to locally melt material, forming a melt pool. As the heat source is translated across the part being fabricated, a bead formed of the moving melt pool with solidified material behind it is formed. Material is fed into the melt pool (either directly or via a powder applied to the surface of the part) and the part is built up one melt pool bead at a time. AM is used for Free Form Fabrication ($F^3$), which is used for the rapid manufacture of a complete part; and for additive manufacturing and repair (AMR), which adds one or more features to an existing component, either as a manufacturing step or for component repair. For instance, AM can be used to build parts from titanium alloys, which has potential applications in the aerospace and medical implant industries.

SUMMARY

In an additive manufacturing (AM) process, a part is fabricated by deposition of successive beads of molten material. The AM process and other similar manufacturing processes are controlled by primary process variables, including, for instance, heat source power (P), translation speed (V) of the heat source, and feed rate of the source material.

The techniques described herein provide a method for mapping the role of these process variables in determining the geometry of the deposited bead and/or a melt pool resulting from deposition of the bead. The resulting process maps may be used to set the primary process variables in order to achieve a desired result in a manufacturing process.

The techniques described herein are applicable to the deposition of single beads of material onto an existing large plate, which is a test that is often used to characterize the performance of a manufacturing tool or machine. These techniques can also be applied to the control of melt pool geometry during the fabrication of complex three-dimensional shapes. The techniques can be applied to processes where no material is added. The techniques can further be applied to map a dimension of a thermal field within or surrounding a melt pool, or a dimension of the thermal field in processes that do not include a melt pool. Furthermore, these techniques may be applied to processes using a laser or electron beam, such as AM processes; or to other processes using other types of heat sources.

In a general aspect, a method includes conducting a plurality of tests of a manufacturing process. Each test is conducted at a different combination of a first process variable and a second process variable. Each test includes locally heating a region of a part, wherein the local heating results in the formation of a thermal field in the part; and assessing a dimension of the thermal field. The method further includes, based on the results of the plurality of tests, generating a process map of the dimension of the thermal field as a function of the first process variable and the second process variable.

In another general aspect, a computer-readable storage medium stores a computer program including instructions for causing a computer system to receive results from a plurality of tests of a manufacturing process. Each test is conducted at a different combination of a first process variable and a second process variable. The results are representative of a dimension of a thermal field formed as a result of locally heating a region of a part. The instructions further include, based on the results, generating a process map of the dimension of the thermal field as a function of the first process variable and the second process variable.

In another general aspect, a method includes generating a plurality of process maps characterizing a process for locally heating a region of a part. Each process map corresponds to at least one of a part geometry and a part temperature. Generating each process map includes conducting a plurality of tests. Each test is conducted at a different combination of a first process variable and a second process variable. Each test includes locally heating a region of the part, wherein the local heating results in the formation of a thermal field in the part; and assessing a dimension of the thermal field. Generating each process map further includes, based on the results of the plurality of tests, generating the process map. The process map maps the dimensions of the thermal field as a function of the first process variable and the second process variable.

In a further general aspect, a computer-readable storage medium stores a computer program including instructions for causing a computer system to generate a plurality of process maps characterizing a process for locally heating a part. Each process map corresponds to at least one of a part geometry and a part temperature. Generating each process map includes conducting a plurality of tests. Each test is conducted at a different combination of a first process variable and a second process variable. Each test includes locally heating a region of the part, wherein the local heating results in the formation of a thermal field; and assessing a dimension of the thermal field. Generating each process map further includes, based on the results of the plurality of tests, generating the process map. The process map maps the dimensions of the thermal field as a function of the first process variable and the second process variable.

Implementations of one or more of the aspects may include one or more of the following features.

Locally heating a region of the surface includes depositing a single bead of material onto a surface of the part, and wherein the thermal field is a melt pool. Depositing a single bead of material includes melting a material source with a heat source.

Locally heating a region of the surface includes forming a melt pool on the surface, and wherein the thermal field is the melt pool.

The manufacturing process is an additive manufacturing (AM) process.

The first process variable and the second process variable are selected from the group consisting of a power (P) associated with the manufacturing process, a translation speed (V) associated with the manufacturing process, and either a material feed rate (MFR) used in the manufacturing process or a ratio of deposited to remelted area ($\gamma$).

The plurality of tests is conducted with process variables other than the first and second process variables held constant.

The dimension of the melt pool is at least one of a cross-sectional area of the melt pool and a length of the melt pool.

The method further includes specifying an operating range of the manufacturing process. Conducting a plurality of tests includes conducting four tests spanning the operating range of the manufacturing process.

Generating a process map includes generating a process map based on a linear interpolation of the melt pool dimension.

The tests are experimental tests or simulations.

The method further includes conducting an additional test; and adjusting the process map based on the results of the additional test.

The method further includes using the process map to select values of the first and second process variables to yield a selected dimension of the melt pool.

The method further includes generating a plurality of process maps characterizing a process for forming a complex part, each process map corresponding to at least one of a part geometry and a part temperature.

The method further includes decomposing the fabrication of a complex part into a combination of one or more geometries; and controlling fabrication of the complex part based on the process maps for forming each of the one or more geometries.

The part geometry includes at least one of a height of the complex part and a width of the complex part.

The systems and methods described herein have a number of advantages. For instance, the generation of process maps enables the relationships between process variables and final part quality to be understood with minimal experimentation or simulation. The processing knowledge that is gained from the process mapping techniques described herein can be extended over a wide range of process variables, thus providing a way to compare results from different pieces of equipment and/or different manufacturing techniques. Furthermore, the techniques described herein can be used as the basis for an evolving database characterizing the deposition of three-dimensional shapes.

Other features and advantages are apparent from the following description and from the claims.

DETAILED DESCRIPTION

Figure 1:
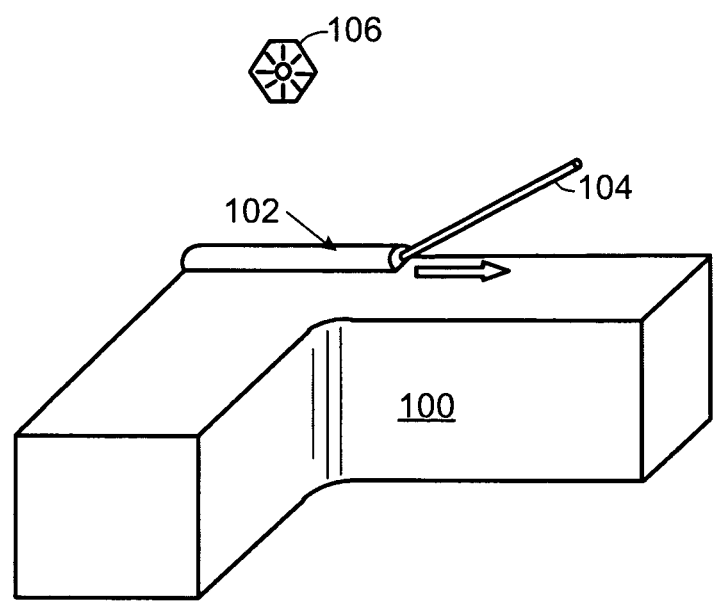
FIG. 1 is a schematic diagram of a setup for an additive manufacturing process.

Referring to FIG. 1, in an additive manufacturing (AM) process, a part 100 is fabricated by deposition of successive beads 102 of molten material. The material is provided from a material source 104, such as a wire feed (as shown), a powder feed, or a powder bed. A heat source 106, such as an electron beam, a laser beam, or an electric arc, melts the material source 104 to generate the bead 102. The heat source 106 is translated relative to the part 100 (or the part is translated relative to the heat source) to cause deposition of beads in a desired geometry to form the part 100.

For a single, specified material, the primary process variables that control AM processes for the deposition of single beads are the heat source power (P), the translation speed (V) of the heat source 106, and the material feed rate (MFR, in units of volume per time) of the material source 104. These process variables also control other similar manufacturing processes, such as welding processes and beam-based surface heat treating processes (which involve the limiting case of MFR=0). The AM deposition of three-dimensional (3-D) geometries (e.g., to form parts) involves additional primary process variables related to the geometry being deposited and the part temperature away from the heat source. In addition, there are also many secondary process variables and conditions that can affect processing, including, for instance, beam focus, wire or powder diameter, deposition environment (e.g., deposition in a vacuum or in an inert gas environment), and other variables.

The techniques described herein provide a method for mapping the role of the primary process variables in determining the geometry of the melt pool resulting from deposition of a bead as secondary process variables are held constant. The techniques can also be used in cases where secondary process variables vary but are fully determined by the primary process variables. In cases where secondary process variables change independently or randomly, the techniques can help identify when secondary process variables affect melt pool geometry by separating out the role of the primary process variables. The resulting process maps may be used to set primary process variables in order to achieve a desired result in a manufacturing process. For instance, the process maps may be used as a guide to selecting appropriate values for P, V, and/or MFR to yield a desired, selected, or pre-determined bead geometry. The process maps may also be used as a guide to changing P and V in order to maintain a desired, selected, or pre-determined geometry as MFR values are changed.

The techniques described herein are applicable to the deposition of single beads of material onto an existing large plate, which is a test that is often used to characterize the performance of an AM machine or other manufacturing tool. These techniques can also be applied to the fabrication of more complex three-dimensional shapes. Although AM processes are typically used to fabricate metal parts, the techniques described herein can be used to support the fabrication of parts of any material compatible with AM processing, welding, beam-based surface heat treating, or other similar manufacturing processes.

Figure 2:
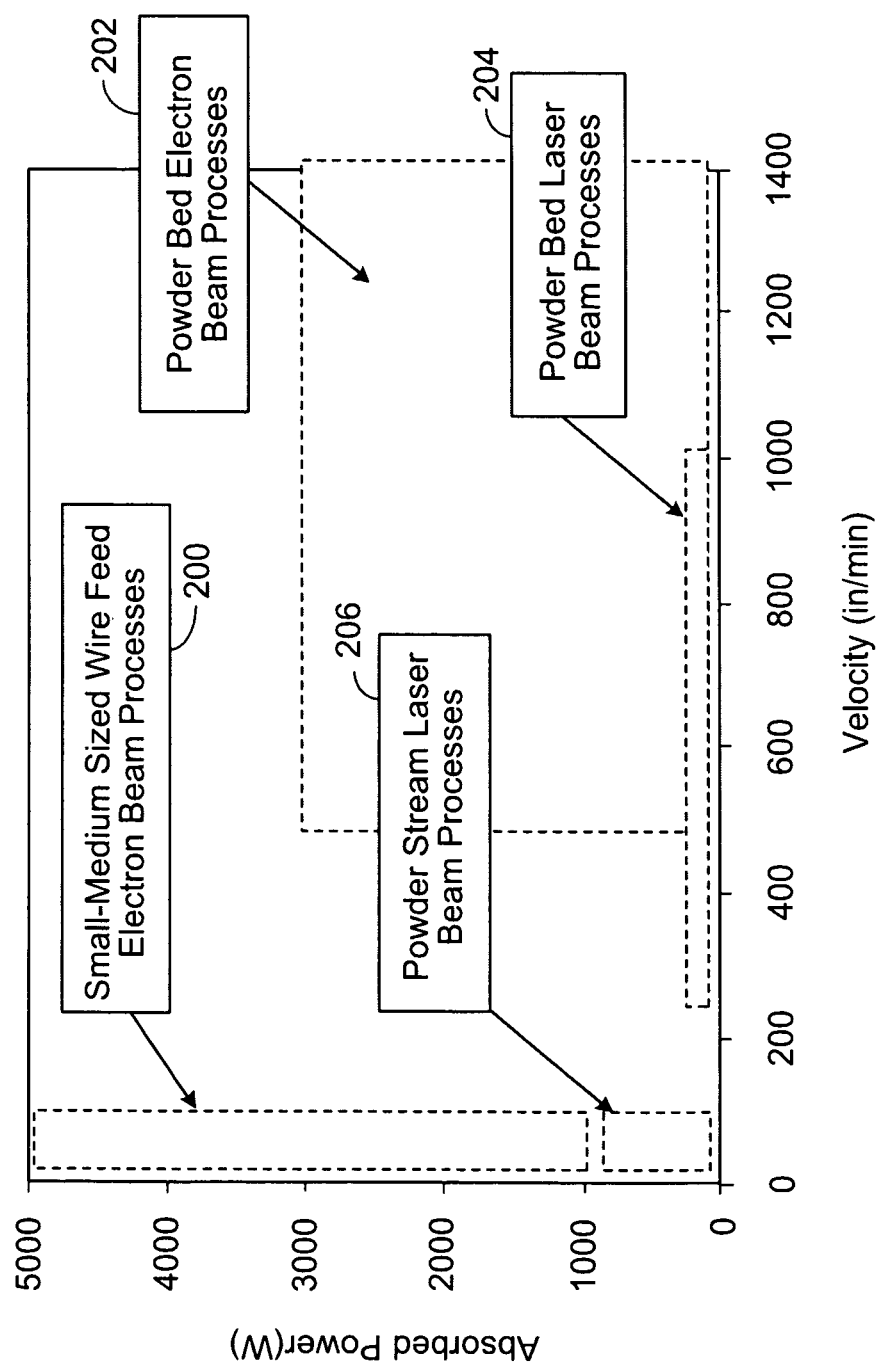
FIG. 2 is a plot of approximate ranges of power and velocity used in various additive manufacturing processes for metals.

Referring to FIG. 2, many types of manufacturing processes spanning a wide range of process variables fall under the purview of AM processing. For instance, AM processes include small- and medium-scale electron beam wire feed processes 200, electron beam powder bed processes 202, laser power bed processes 204, and laser powder stream processes 206. Large-scale electron beam processes operating at beam powers of, e.g., 20 kW or more (not shown in FIG. 2) may also be considered to be AM processes. The techniques described herein are applicable to the full range of process variables used in these and other AM processes.

Melt Pool Geometry

Figure 3:
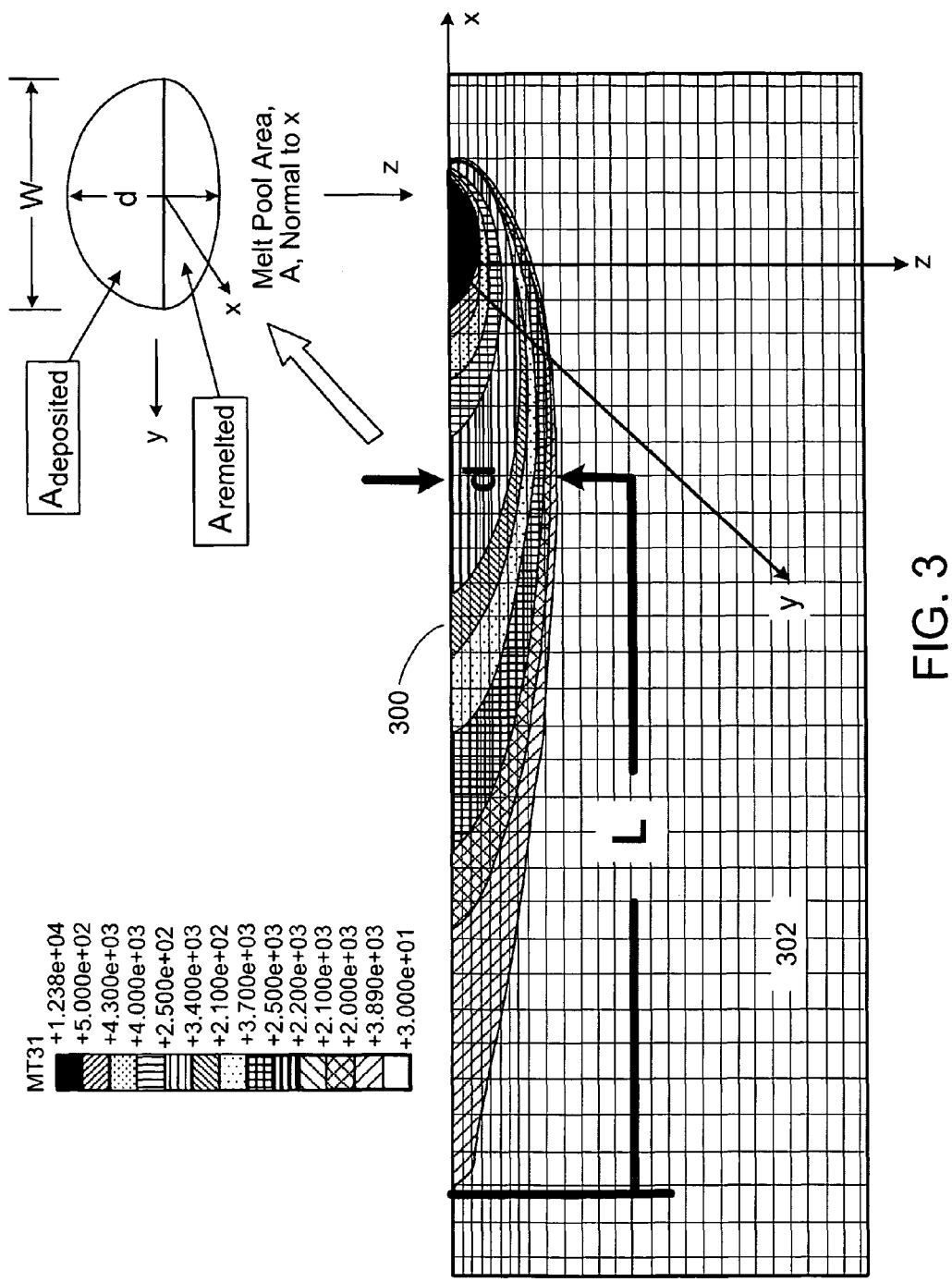
FIG. 3 is a diagram of melt pool dimensions.

Referring to FIG. 3, when a bead of material is deposited onto a surface in an AM process, a melt pool is formed including the molten bead of material and any material of the surface that has melted as a result of the bead deposition. A cross-section of a melt pool 300 on the surface of a part 302, derived from a finite element model, depicts melt pool dimensions that may be relevant in developing process maps. In FIG. 3 the melt pool is moving in the positive x direction (i.e., the direction of V).

More generally, when a local heat treatment is applied to a surface (e.g., via a moving heat source), a thermal field is created on the surface. In some instances, some or all of the thermal field is melted; in other instances, the temperatures of the thermal field are raised relative to the temperature of the surrounding surface, but melting does not occur. In the following description, reference is made to the dimensions of the melt pool; however, it is to be understood that the dimensions of the thermal field may be treated similarly to the dimensions of the melt pool.

The techniques described herein provide for a mapping of the role of primary process variables on melt pool dimensions, such as the melt pool cross-sectional area, the melt pool length, and the melt pool depth.

In the following description, the maximum melt pool cross-sectional area, A, is the area of the melt pool normal to the x-axis (and thus normal to the direction of travel of the melt pool), at the deepest point of the melt pool. The melt pool length, L, is the length of the melt pool from the x location of A to the trailing tip of the melt pool. In some instances, L may instead represent the total melt pool length. The melt pool depth, d, is indicative of the maximum depth of the melt pool. In some instances, d is the actual maximum depth of the melt pool. In other cases, d is an effective depth of the melt pool as calculated from A using the formula $d=\sqrt{2A/\pi}$.

The maximum melt pool cross-sectional area, A, equals the cross-sectional area of the deposited bead ($A_{deposited}$) plus the cross-sectional area of the material melted on the surface of the part ($A_{remelted}$). Thus, controlling A while maintaining the ratio of bead to part melt pool cross-sectional area results in the control of the deposited bead cross-sectional area. In addition, the deposited bead area times V equals the MFR, i.e., $MFR=V*A_{deposited}$. In addition, A times V equals the total melting rate (TMR) for the AM process, i.e., $TMR=V*A$.

The melt pool length, L, relates to the shape of the solidification front behind the melt pool. In some cases, a dimensionless variable, L/d, is used, which relates to the aspect ratio or shape of the trailing end of the melt pool.

Although the following description uses A, L, and L/d (where L is measured from the x location of A to the trailing tip and d is an effective depth) as the relevant melt pool dimensions for the preparation of process maps, the use of other dimensions is also within the scope of the techniques described herein. For instance, the melt pool maximum width, W, or the actual melt pool depth may be used, both of which behave similarly to the square root of the melt pool maximum cross-sectional area, A. The total melt pool area viewed from above may also be used, and takes on behavior similar to that of W times the total length of the melt pool.

The cross-sectional area, A, can be determined by post-deposition sectioning and analysis of the bead and part. For instance, A may be measured or assessed using a cross-section microscopy measurement of the cross-sectional area of the deposited material plus any melted material from the underlying surface. The melt pool length, L, can be measured or assessed via real-time melt pool imaging. The width, W, and the total melt pool area can be viewed from above, e.g., via thermal imaging. W can also be measured via cross-section microscopy.

The process mapping techniques described herein enable mapping of the role of primary process variables on melt pool dimensions. In some embodiments, the primary process variables are P, V, and MFR. In other embodiments, an alternative primary variable, γ, is used in place of the MFR. The variable γ, which represents the deposited to remelted area ratio ($\gamma=A_{deposited}/A_{remelted}$), directly relates the size of the added bead of material to the size of the material melted in the existing part and thus relates the effect of those sizes on heat transfer into the part.

The variables γ and MFR are related. Specifically, $MFR=V*A_{deposited}$, where $A=A_{deposited}+A_{remelted}$. From these relationships, it can be determined that $$MFR = V*A \bigg/ \left(1+\left(\frac{1}{\gamma}\right)\right).$$

When the process mapping is to determine the role of process variables on melt pool dimensions and/or to determine how local bead geometry affects melt pool dimensions, the use of γ may be more relevant. For manufacturing control, MFR may be the more relevant variable.

Additional process variables, such as an alternative process variable that relates to the local geometry of the melt pool, may also be used for the process mapping techniques described herein.

Single Bead P-V Process Mapping

Figure 4:
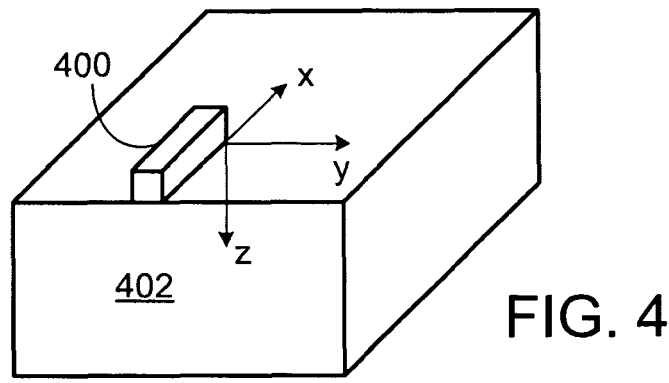
FIG. 4 is a block diagram of a single bead geometry.

Referring to FIG. 4, single bead deposition is often used as a test to characterize or evaluate the performance of an AM machine. Process mapping of single bead deposition involves determining the effect of primary process variables on the geometry of the melt pool created by deposition of the single bead 400.

In single bead deposition, a single bead 400 of material is deposited onto a flat plate 402. In general, the plate is large enough in the x and y directions that the melt pool geometry in the middle of the plate (where melt pool dimensional measurements are typically made) is not affected by the free edges of the plate. The plate thickness (in the z direction) may be large enough that the bottom surface does not affect the melt pool geometry. Alternatively, the plate thickness may be a thickness set by the user and held constant across all tests.

In AM processing, the value of $\gamma$ is typically held constant, so that process maps that map melt pool geometry for a single value of $\gamma$ are most relevant. Thus, in the foregoing description, details are given for P-V process mapping for a single value of $\gamma$ using a small number of initial experiments and/or simulations. Process maps for a fixed value of MFR may also be developed using similar procedures. Melt pool geometry can also be mapped for multiple values of $\gamma$ (e.g., for selected values of $\gamma$ and/or for the entire range of $\gamma$) using similar techniques. Process mapping for multiple values of $\gamma$ can be simplified by first constructing maps for the extreme values of $\gamma=0$ (no added material) and $\gamma$ approaching infinity (no remelted material) to determine the importance of $\gamma$ on the process maps.

A single bead P-V process map is generated for a given value of $\gamma$ according to the following assumptions: (1) the initial temperature of the plate 402 is constant for each single bead deposition; and (2) as each single bead 400 is deposited, the plate 402 is not heated enough to alter the melt pool geometry. Under these conditions, the melt pool cross-sectional area A and length L will reach a steady state after the heat source travels a distance of multiple melt pool lengths. In the embodiment described below, the mapping procedure is used to map steady state values of A and L (or other melt pool dimensions). In other embodiments, the mapping procedure may be used to track transient responses of the melt pool (e.g., how melt pool geometry changes as deposition is initiated near a plate edge and progresses toward the plate center).

Figure 5:
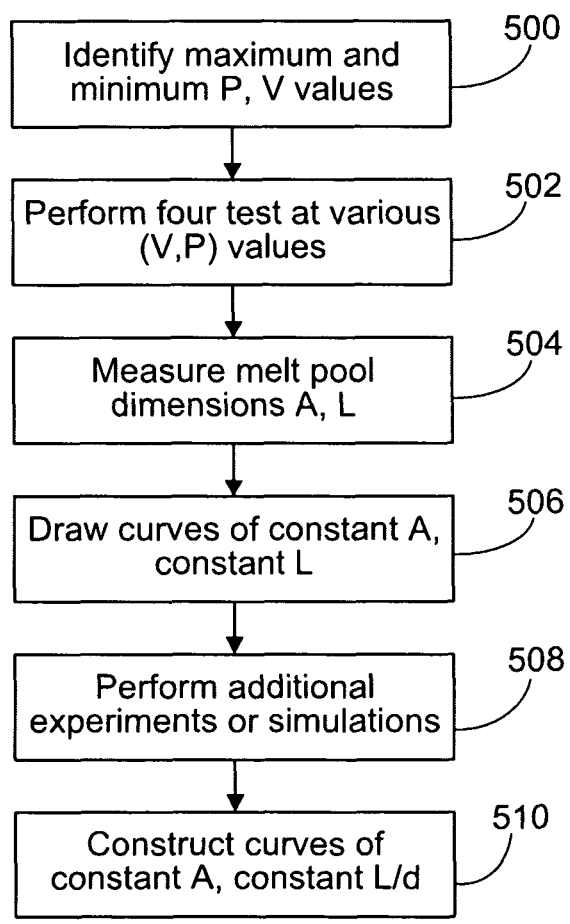
FIG. 5 is a flowchart of the process of generating a power-velocity (P-V) process map.

Referring to FIG. 5, to generate a single bead process map for a particular value of $\gamma$, minimum and maximum P and V values of interest (e.g., a range of P and V relevant to a particular type or types of AM process) are identified (500) to define the P and V operating ranges for the process map.

Within these P and V ranges, an initial, approximate plot of curves of constant A and constant L is generated based on a small number of experimental or simulated tests. Specifically, four tests are performed (502) via experimentation and/or simulation at the following values of (V, P):

1. $(V_{max}, P_{max})$
2. $(V^*, P_{min})$, where $V^*$ is the value of V at $P_{min}$ on a straight line drawn between $(V_{max}, P_{max})$ and $(0,0)$
3. $(V_{min}, P_{max})$
4. $(V_{min}, P_{min})$ In an alternative embodiment, initial Test 2 (502) may be performed at $(V_{max}, P_{min})$. However, in some instances, conducting Test 2 at $(V^*, P_{min})$ may produce more precise results than conducting Test 2 at $(V_{max}, P_{min})$. The melt pool will exist for a value of V=0 and a non-zero value of P. Thus, all curves of melt pool dimensions will intersect the P axis above P=0 and process map results of interest are above the straight line between $(V_{max}, P_{max})$ and (0,0).

For these initial tests, $\gamma$ can be any single value between 0 (no added material) and infinity (no remelted material) and the resulting process map will be for that value of $\gamma$. However, because the melt pool areas, A, are not known for each case (assuming no prior experiments have occurred), a nonzero value of $\gamma$ may not be able to be accurately specified before each test is performed. To address this issue, the first four tests may be performed with $\gamma=0$ (no added material). Subsequent tests (see below) can be performed with $\gamma=0$ to create an increasingly accurate P-V process map for $\gamma=0$. Alternatively, the values of A from the first four tests with $\gamma=0$ can be used to approximate MFR values associated with a desired, nonzero value of $\gamma$ in subsequent tests (ultimately creating an accurate P-V process map for a single nonzero value of $\gamma$).

For each test, the melt pool dimensions A and L are measured or assessed (504). In some embodiments, for instance when real-time imaging is unavailable, only A is measured or assessed such that a process map is then constructed only for A.

Once A and L are determined for each of the four tests, A and L can be linearly interpolated between the A and L data obtained from each of the four tests to generate a first P-V process map including curves of constant A and constant L (506). In particular, A and L can be linearly interpolated in terms of V at $P_{min}$ and $P_{max}$. Straight lines of constant A are drawn from $P_{min}$ to $P_{max}$ based on the linear interpolation. Values of L are then linearly interpolated along the lines of constant A and straight lines of constant L are drawn. In some cases, these linear interpretations are reasonably accurate. In other cases, (e.g., for certain materials and/or certain process variable ranges), stronger nonlinear behavior in P and/or V may make these linear interpolations less accurate.

The constant A and constant L curves may be defined more precisely through additional experiments and/or simulations (508), e.g., at midpoint locations between points on the process map representative of existing tests. For instance, a test may be performed at $(V_{min}, (P_{max}+P_{min})/2)$. Curves may be generated between test data points using, e.g., piecewise linear fitting, $2^{nd}$ order curve fitting, or any other appropriate curve fitting model.

A second P-V process map including curves of constant A and constant L/d can be derived from the first P-V process map (510). Derived values of d, L/d, and/or the total melt rate (TMR=V*A) can be determined at various locations on the first process map. Based on these derived values, the second P-V process map is constructed in which curves of constant L/d replace the curves of constant L. TMR values may be identified for constant powers and various values of A.

The accuracy of the first process map and/or the second process map can be increased by performing additional experiments and/or simulations. If desired, additional process maps may also be generated at different $\gamma$ values. Process maps can also be generated for different uniform preheat temperatures in the plate at the start of deposition. Over time, data can be added to a process map such that the process map more accurately characterizes a particular piece of equipment. In some embodiments, the additional experiments and/or simulations involve changing secondary process variables to quantify their role in changing melt pool geometry across the range of primary process variables.

Similar mapping techniques can also be applied to the geometry of a generalized thermal field, such as a region of a surface (or subsurface) that is heated to a specified temperature (e.g., a specified maximum temperature), where the specified temperature may be greater than, equal to, or less than the melting temperature. When a melt pool is present, similar mapping techniques may also be used to quantify the size of a region bounded by a specified temperature, such as a temperature above or below the melting temperature (within or outside of the melt pool boundary, respectively).

Figure 6:
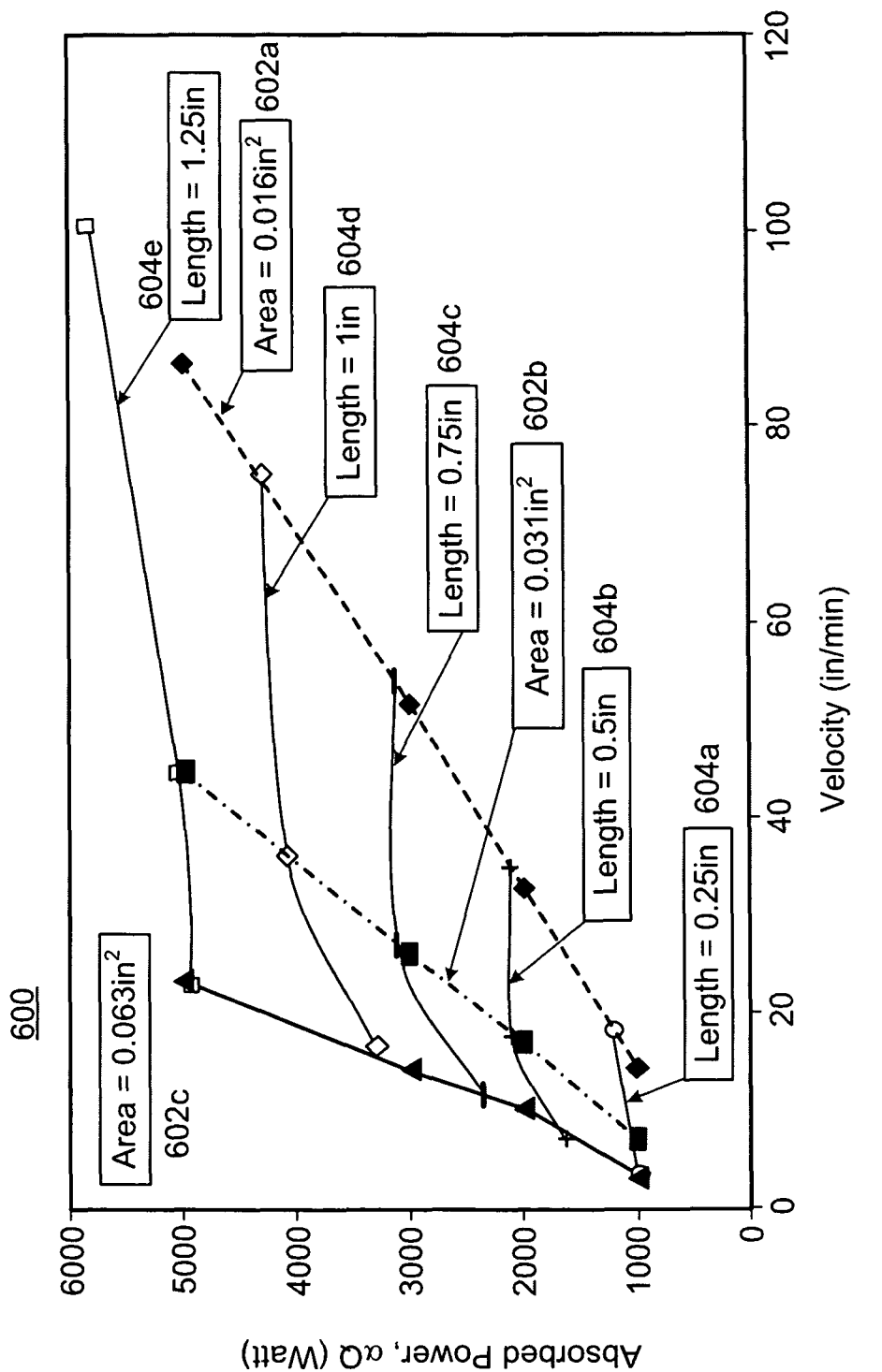
FIG. 6 is a P-V process map depicting curves of constant melt pool area (A) and constant melt pool length (L) for a single bead geometry.

Referring to FIG. 6, in one example, a single bead P-V process map 600 is depicted. The process map 600 was developed over many simulations based on numerical modeling of a wire feed electron beam AM process for the deposition of a single bead of the titanium alloy Ti-6Al-4V (referred to herein as Ti64) with a single value of $\gamma$. The minimum and maximum P values are approximately 1 kW and 5 kW, respectively, and the minimum and maximum V values are approximately 5 in/min and 100 in/min, respectively.

Three curves 602a, 602b, 602c of constant A (A=0.016 in$^2$, 0.031 in$^2$, and 0.063 in$^2$, respectively) were generated. In addition, five curves 604a, 604b, 604c, 604d, 604e of constant L (L=0.25 in, 0.5 in, 0.75 in, 1 in, and 1.25 in, respectively) were generated.

In the example of FIG. 6, for Ti64 in the range of P and V values depicted, curves of constant A are nearly linear and interpolations between curves of constant A in terms of V are also nearly linear, thus suggesting that the use of linear interpolation for A is relatively accurate. Curves of constant L are not linear, but are close enough that a linear fit yields a reasonable first estimate.

Figure 7:
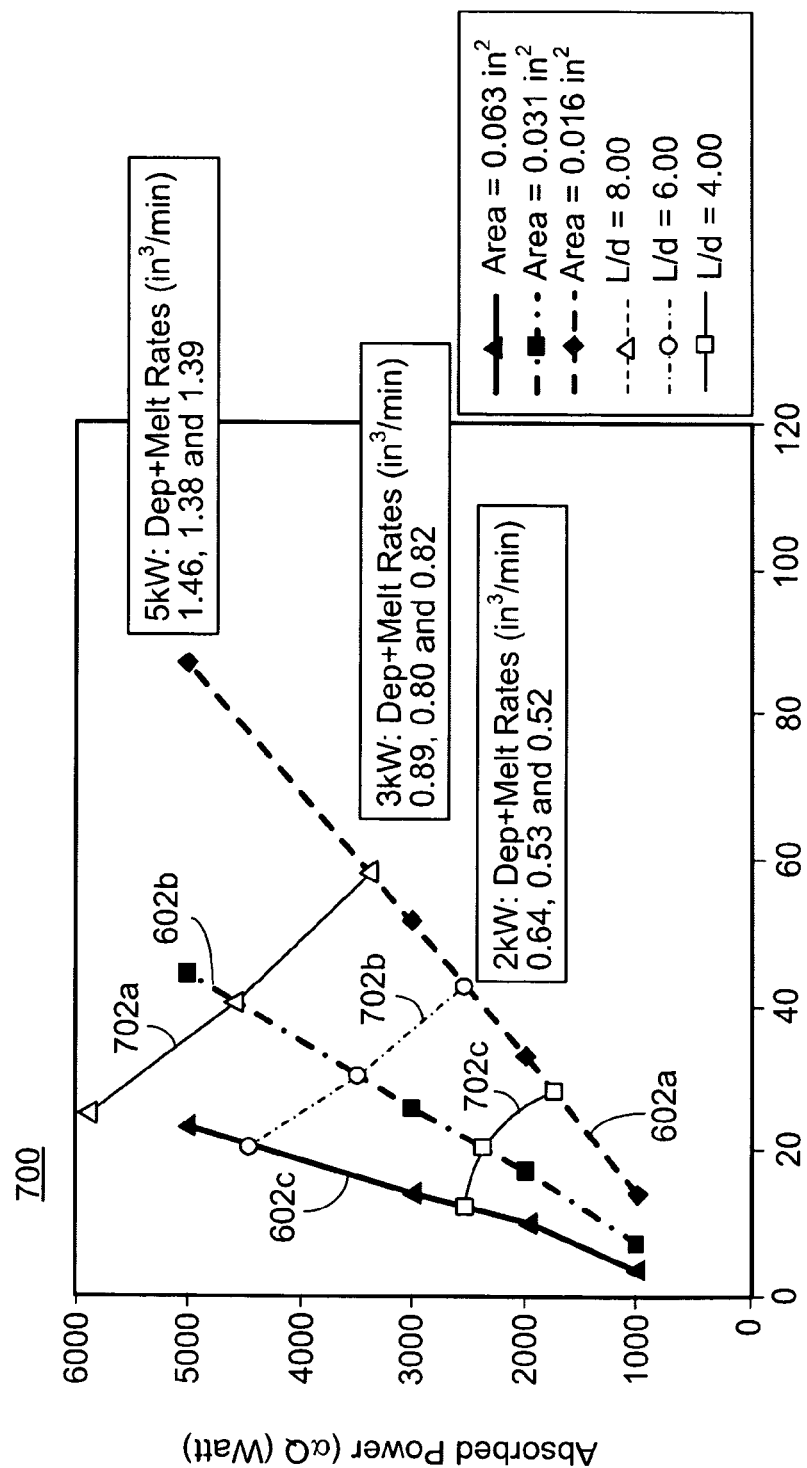
FIG. 7 is a P-V process map derived from the P-V process map of FIG. 6, depicting curves of constant A and constant melt pool length over depth (L/d).

Referring to FIG. 7, a P-V process map 700 in terms of A and L/d was derived from the process map 600 in terms of A and L as described above. The constant area curves 602a, 602b, 602c are still depicted. In addition, three curves 702a, 702b, 702c of constant L/d (L/d=4.00, 6.00, 8.00, respectively) were also generated. The P-V process map 700 maps out the control of melt pool size (i.e., area, A) and melt pool shape (i.e., aspect ratio, L/d) over the process variable range. TMR values were obtained at three constant power values of 2 kW, 3 kW, and 5 kW for different values of A. The TMR values given in the process map indicate that TMR is largely dependent on P and only weakly dependent on V.

Figures 8, 9:
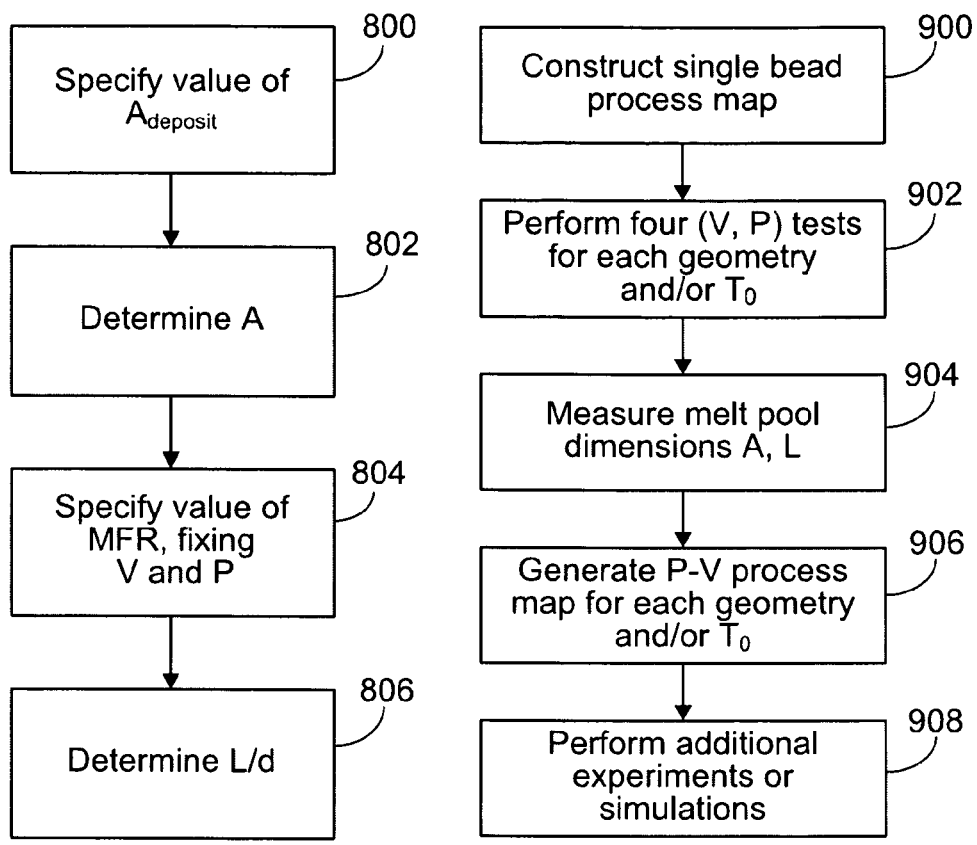
FIG. 8 is a flowchart of the process of using a P-V process map.
FIG. 9 is a flowchart of the process of generating a process map for a three-dimensional geometry.

Referring to FIG. 8, once the P-V process map in terms of A and L/d (e.g., map 700) is constructed for a single value of $\gamma$, the P and V values yielding a desired $A_{deposit}$ and MFR (in units of volume/time) can be determined. In one embodiment, the P and V values are determined as follows; however, the data in the process map 700 may also be used in other ways to determine P and V. A desired value of $A_{deposit}$ is specified (800). Based on the specified value of $A_{deposit}$ and the $\gamma$ value for the process map, the value of A is determined (802), fixing the relevant constant A curve. A desired value of MFR is then specified (804). Because MFR=V*$A_{deposit}$, the specified value of MFR fixes V, which in turn fixes P along the constant A curve. The value of L/d is then determined from the fixed V and P values (806).

The P-V process map in terms of A and L/d (e.g., map 700) can also be used as a guide to maintaining A or L/d as P, V, and MFR are changed. To maintain A while changing MFR, both P and V are increased or decreased while staying on the relevant constant A curve. At the same time, MFR is increased or decreased proportionally with V to maintain the $\gamma$ value of the process map. In moving along the constant A curve while MFR is adjusted, the ratio of L/d is changed. Alternatively, the MFR can be increased or decreased proportionally with V to stay on the relevant constant L/d curve, causing the value of A to be changed as L/d is maintained. Paths on the P-V process map where A and L/d are both maintained typically do not exist.

3-D Process Mapping

The techniques described above for the mapping of melt pool geometry for single bead deposition can be extended to characterize the deposition of three-dimensional (3-D) parts. In particular, a single bead P-V map can be used as the basis for comparison for P-V maps of commonly fabricated geometries or features. Construction of P-V process maps for commonly fabricated features allows melt pool geometry to be maintained across all features. Once P-V maps are developed for these features, general, complex 3-D part geometries can be fabricated by decomposing the complex geometries into combinations of common, mapped features.

In 3-D deposition, variables in addition to P, V, and MFR (or $\gamma$) are relevant to the melt pool geometry. Process maps for 3-D geometries include these additional variables. The geometry of the 3-D part itself is represented by a first additional variable (or, in some cases, by more than one additional variable). The part temperature away from the heat source, $T_0$, is a further additional variable to be considered in 3-D process mapping. The part temperature can be due to active preheating of the part through external means or can be due to heat build-up from the heat source, e.g., caused by prior deposition of material. In some cases (e.g., depending on processing conditions), geometry and/or $T_0$ can alter the melt pool geometry. The role of geometry and $T_0$ can be represented through a set of P-V process maps, where each process map corresponds to a discrete value of the geometric variable or $T_0$ (just as the role of $\gamma$ can be represented through a set of P-V process maps with different values of $\gamma$). Alternatively, data from multiple process maps can be superimposed onto a single P-V plot, or a 3-D plot can be constructed with an additional variable on the $3^{rd}$ axis of the plot.

In AM processing, the value of $\gamma$ is typically held constant, such that process maps that map melt pool geometry for a single value of $\gamma$ are relevant. In the techniques described below, melt pool geometry is mapped in terms of a geometric variable and/or $T_0$ for a single value of $\gamma$. Melt pool geometry can also be mapped in terms of a geometric variable and/or $T_0$ for multiple values of $\gamma$ (e.g., for selected values of $\gamma$ and/or for the entire range of $\gamma$) using similar techniques.

Referring to FIG. 9, in general, process mapping for 3-D geometries involves the generation of multiple P-V process maps. A single bead P-V process map is constructed following the techniques described above (900). For each new geometry (e.g., for each height or width of the 3-D feature), and for each new value of $T_0$, tests are conducted at the four (V, P) combinations listed above (902) and the melt pool dimensions A and L are measured or assessed (904). Via linear interpolation, a first P-V process map including curves of constant A and constant L is generated (906) for the particular geometry and/or $T_0$ within the V and P ranges of the single bead P-V process map. The geometry-specific, $T_0$-specific process map can then be used to determine the P and V for the new geometry and $T_0$ that will result in the same values of A and L used in the baseline single bead geometry.

The constant A and constant L curves may be defined more precisely through additional experiments and/or simulations (908) to increase the accuracy of the process map. These additional data points may be more important in the mapping for cases of different geometries and/or $T_0$ values than in the single bead mapping because the geometry- and $T_0$-dependent curves may not only shift, but also change shape compared to the single bead case.

If desired, additional process maps may also be generated at different γ values. Since the melt pool areas may not be known in advance, additional experiments may be carried out to hold γ sufficiently constant across all tests for a single geometry and $T_0$.

In practice, process mapping may be simplified. For instance, the effect of $T_0$ may only be a concern in certain cases, such as continuous deposition (i.e., no pausing between bead deposition) resulting in heat build-up, or deposition of one bead at a time followed by a pause to allow the part to cool to ambient temperature. If the effect of $T_0$ is apparent only in these cases, then process maps can be generated only for these cases. As another example, when a part is actively preheated to a particular $T_0$ value prior to deposition, only a few values of $T_0$ may be of interest.

Figure 10:
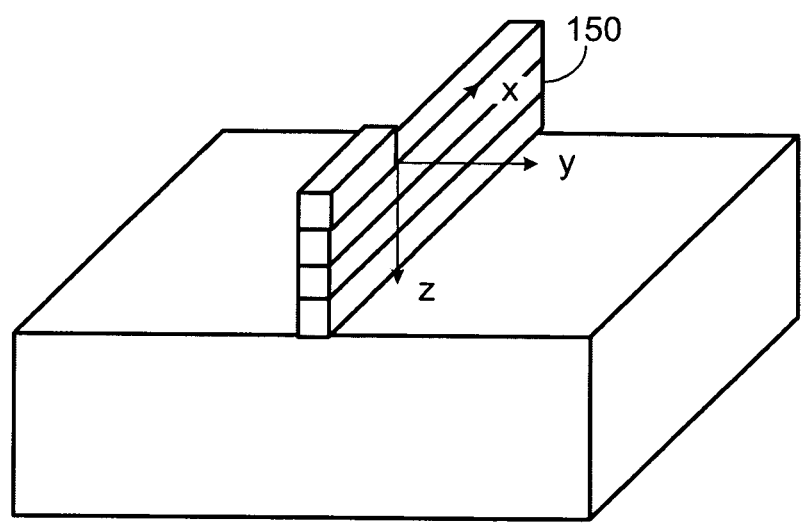
FIG. 10 is a block diagram of a single pass thin wall geometry.

Referring to FIG. 10, one example of a geometry commonly fabricated by AM is a single pass thin wall 150, which is a wall having the width of a single deposited bead, built by depositing one bead on top of another. A series of process maps for A and L/d for a point in the middle of the wall (i.e., away from the free edges) can be constructed for different heights of the thin wall 150. Increments in wall height (the geometric variable) can be expressed, e.g., in terms of numbers of beads added to the wall.

A single pass thin wall having a height of only one bead is equivalent to the single bead geometry described above. When a second bead is deposited on top of the first bead, the wall is hotter (i.e., $T_0$ is increased) and the change in geometry causes the path of heat conduction into the substrate to be more restricted as compared to the single bead case. These changes cause changes in the location and shape of the constant A and constant L/d curves compared to those for the single bead case. For each wall height (the geometric variable) and $T_0$ of interest, a complete P-V process map can be generated.

Figure 11:
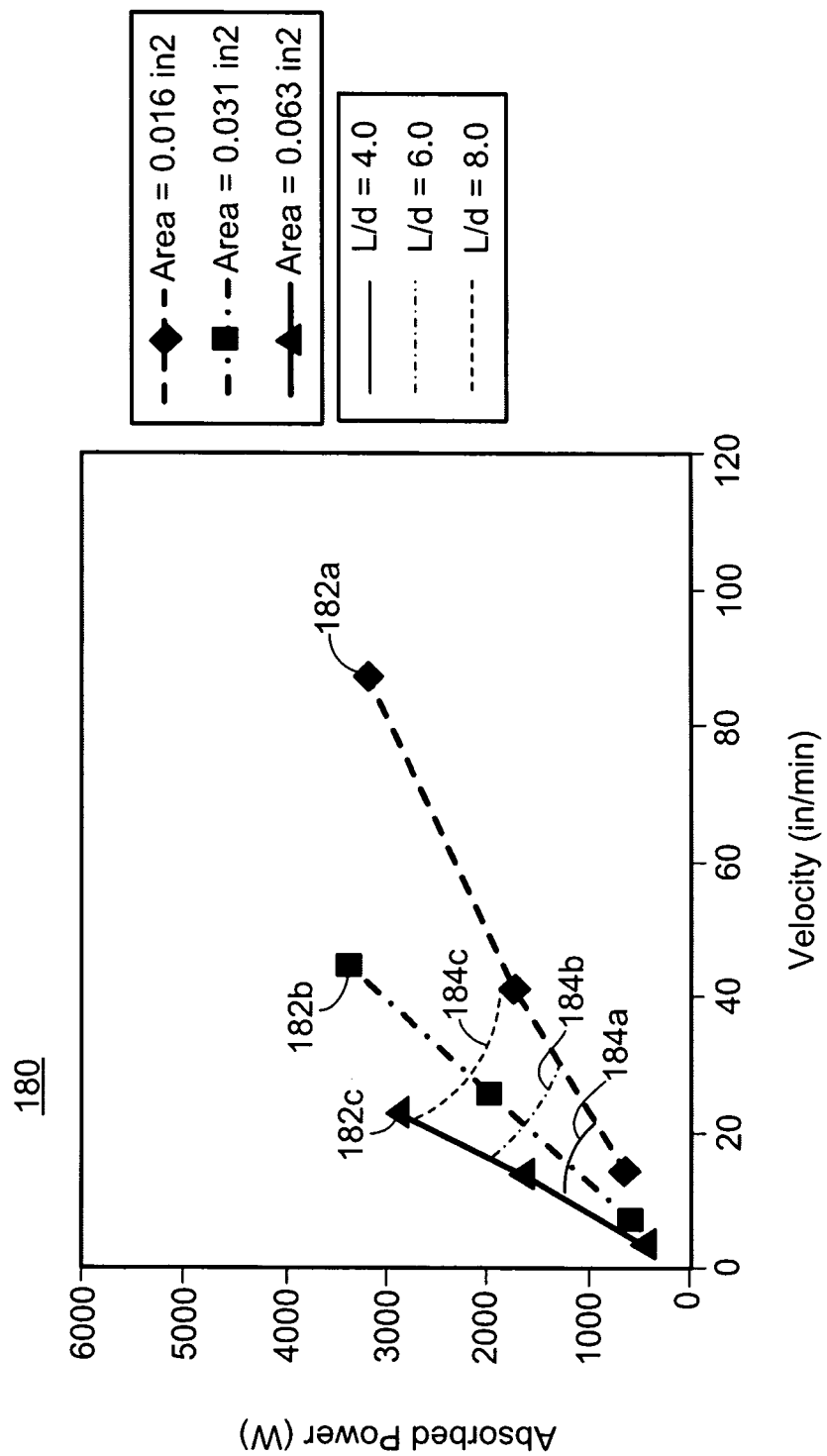
FIG. 11 is a schematic of a P-V process map depicting curves of constant A and constant L/d for a single pass thin wall geometry.

Referring to FIG. 11, a schematic drawing of a P-V process map 180 is depicted for a given wall height and $T_0$ for a wire feed electron beam AM process for the continuous (non-stop) deposition of a single wall formed of Ti64 (analogous to the single bead P-V process map 700). Curves 182a, 182b, 182c of constant A (A=0.016 in², 0.031 in², and 0.063 in², respectively) and curves 184a, 184b, 184c of constant L/d (L/d=4.0, 6.0, and 8.0, respectively) are depicted.

The new geometry and the temperature increase from continuous deposition cause curves of constant area to shift downward relative to the curves of the single bead case, such that a given constant A or constant L/d curve is situated at a lower P for the same value of V (e.g., as compared to the single bead process map 700). The downward shift of the constant A and constant L/d curves continues for deposition of successive beads until a "tall wall" limit is reached for both $T_0$ and geometry. The magnitude of the downward shift with the addition of each bead is largest for short walls and decreases with deposition of each bead, approaching zero as the wall height increases.

Depending on variables and conditions such as the speed of deposition, the process variables used, the size of the part, the order of the bead deposition, and other conditions, the existing temperature of the part where a bead is being deposited may vary, even for a single type of geometry. The effect of part temperature away from the heat source, $T_0$, can be treated as a separate, independent variable and the effect of $T_0$ on melt pool geometry can be mapped. Furthermore, part temperature away from the heat source is easily monitored in real time and thus compensation for variations in part temperature can be carried out. The location selected for monitoring $T_0$, is up to the user, provided the location is away from the local thermal field of the heat source and is consistent throughout the tests.

Referring to FIGS. 12-18, the deposition of various commonly fabricated 3-D geometries or features may also be mapped in a manner similar to the single pass thin wall described above. In general, the deposition of complex shapes can be decomposed into combinations of simpler, commonly fabricated geometries, each of which may have one or a series of associated process maps. The following list of commonly fabricated geometries or features is not exclusive, and process maps may be constructed for any other relevant geometry in a similar manner. In the geometries depicted in FIGS. 12-18, the coordinate origin is taken to be the location where the heat source is positioned, and deposition proceeds in the positive x direction.

In the following geometries (referred to herein as "steady-state geometries"), the geometry is constant in the deposition direction (away from free edges of the geometry):

Single bead geometry (FIG. 4)

Single pass thin wall (FIG. 10). As the thin wall is built, the geometry approaches the steady-state "tall wall" limit discussed above. A single pass thin-walled cylinder may also be considered a single pass thin wall, provided the radius of curvature of the cylinder is not too small.

Figure 12:
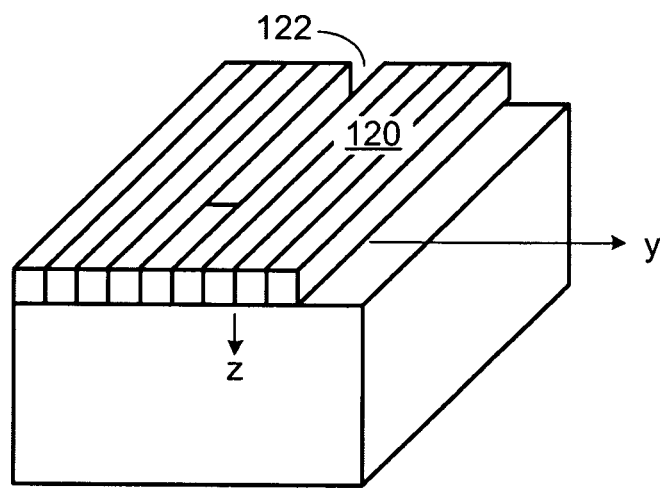
FIG. 12 is a block diagram of a fill geometry.

Fill between existing beads (FIG. 12). In this case it is assumed that many beads 120 exist on either side of a channel 122 that is being filled, so the effect of the number of beads 120 on either side is not generally mapped out. This geometry is very similar to the case of adding no material at all (i.e., γ=0), with a beam simply translated across a large plate. However, when no material is added, conduction into material ahead of the moving beam is allowed. In the fill case, the material ahead of the moving beam is not present.

Figure 13:
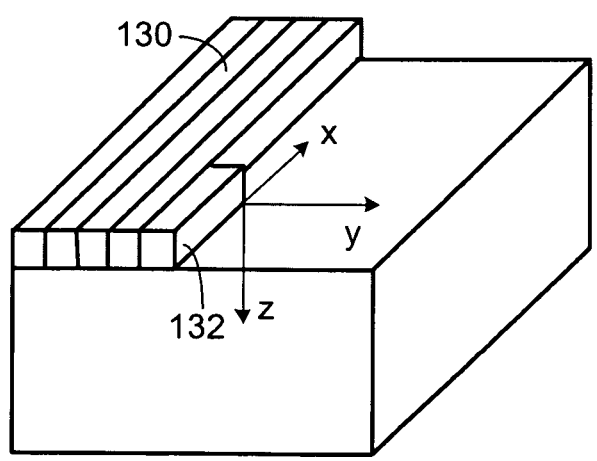
FIG. 13 is a block diagram of a sequential bead geometry.

Sequential bead (FIG. 13). This geometry is used to fill an internal area, ultimately ending with the fill geometry of FIG. 12. In this case it is assumed that many beads 130 exist to the left of a bead 132 being deposited.

Figure 14:
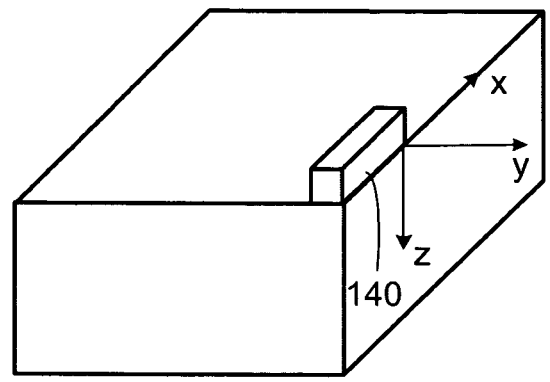
FIG. 14 is a block diagram of a free edge geometry.

Free edge (FIG. 14). This geometry can be used to define an outer perimeter of a layer. Multiple geometries may be considered as beads 140 move in away from the edge. For instance, the number of beads that are sufficient to reach steady state and to yield the same results as the sequential bead geometry of FIG. 13 may be determined.

Figure 15:
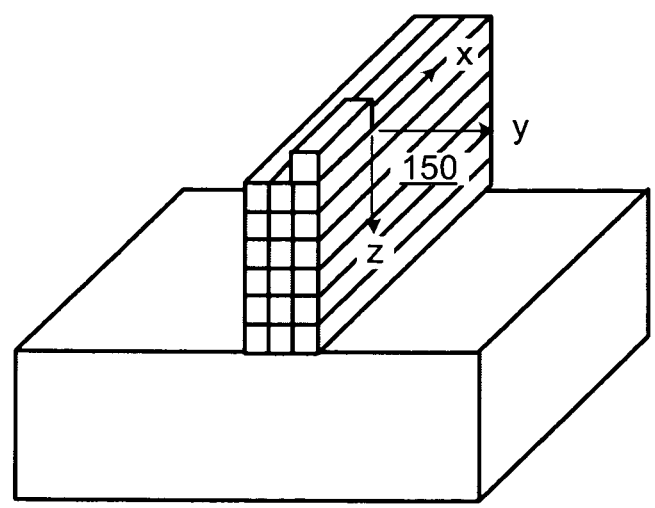
FIG. 15 is a block diagram of a tall multi-pass thin wall geometry.
Figure 16:
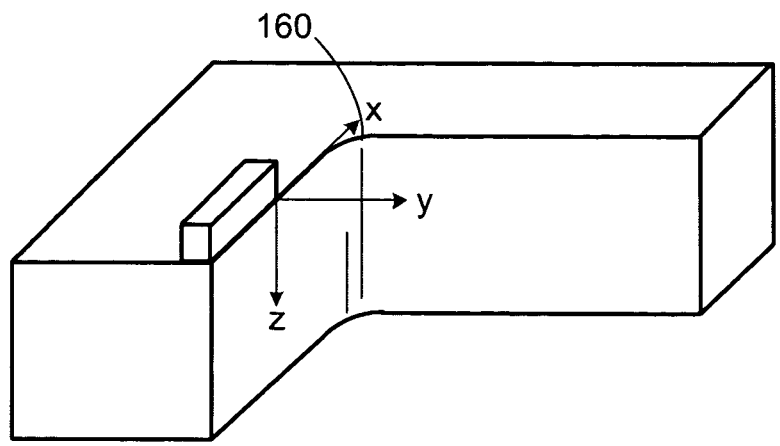
FIG. 16 is a block diagram of an internal radius geometry.

Tall multi-pass thin wall (FIG. 15). In this geometry, free edges of a wall 150 can be deposited first. Once the edges are deposited, the wall is filled. Alternatively, the wall is constructed by starting at one face and progressing across the thickness of the wall. There are multiple wall thicknesses to be mapped prior to reaching a "thick wall" limit. For each thickness, there are multiple geometries to consider, including free edge, sequential bead, and fill type configurations. In addition, the height dependence of the wall may be mapped. As with the single pass thin wall, the multi-pass thin wall may also be applied to the deposition of a multi-pass thin-walled cylinder, provided the radius of curvature is not too small.

Figure 17:
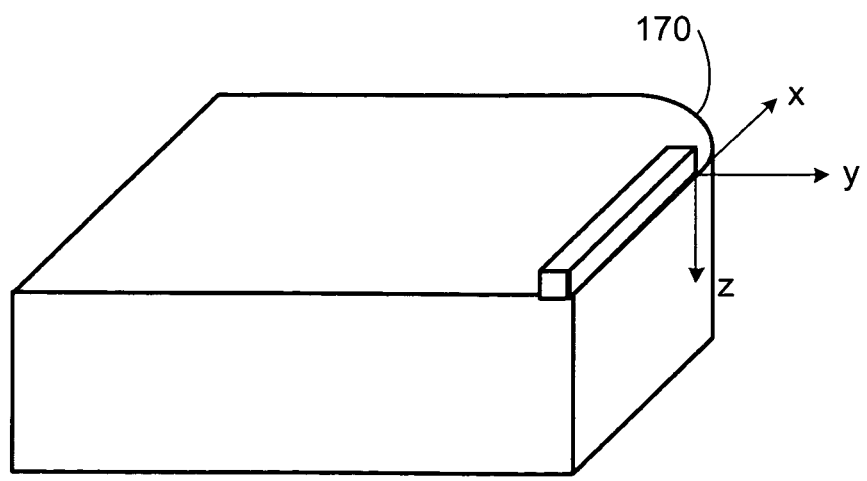
FIG. 17 is a block diagram of an external radius geometry.

In the following geometries (referred to herein as "transient geometries"), the geometry changes in the deposition direction:

Internal radius (FIG. 16) and external radius (FIG. 17). For these geometries, there are various radii to be mapped for deposition around a turn 160, 170. In some cases, the ratio of radius to melt pool depth may govern the melt pool behavior. In addition, various turn angles can be mapped; a 90° turn is a common example turn angle. The radius geometry may be executed in combination with various geometries, such as the steady-state geometries described above.

Figure 18:
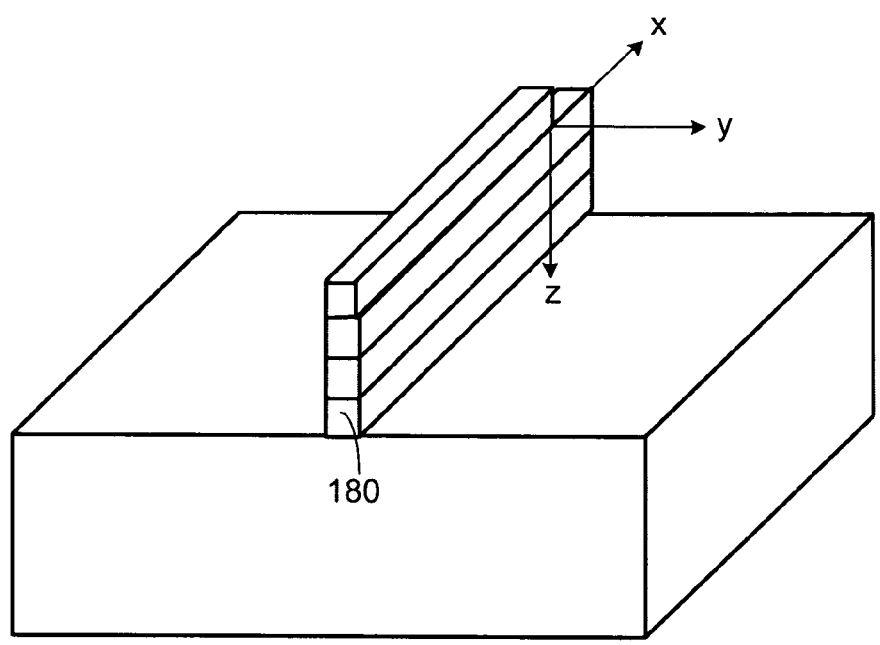
FIG. 18 is a block diagram of an approaching edge geometry for a thin wall.

Thin wall approaching and/or leaving an edge (FIG. 18). Approaching a free edge 180 and leaving a free edge may cause different results and process maps may be developed for both cases.

In the steady-state geometries (FIGS. 4, 10, and 12-15), if process variables are held constant during deposition then melt pool geometry does not change, because the geometry of the feature does not change in the deposition direction. In general, the techniques described herein for generating process maps are directly applicable to these steady-state geometries.

In the transient geometries (FIGS. 16-18), as deposition processes under constant P and V conditions, the melt pool geometry is generally changed via its interaction with a radius or free edge. The techniques described herein for generating process maps can also be applied to map these transient geometries; however, for each combination of process variables, melt pool dimensions may be a function of location of the moving heat source as it travels through the changing geometry.

Figure 19:
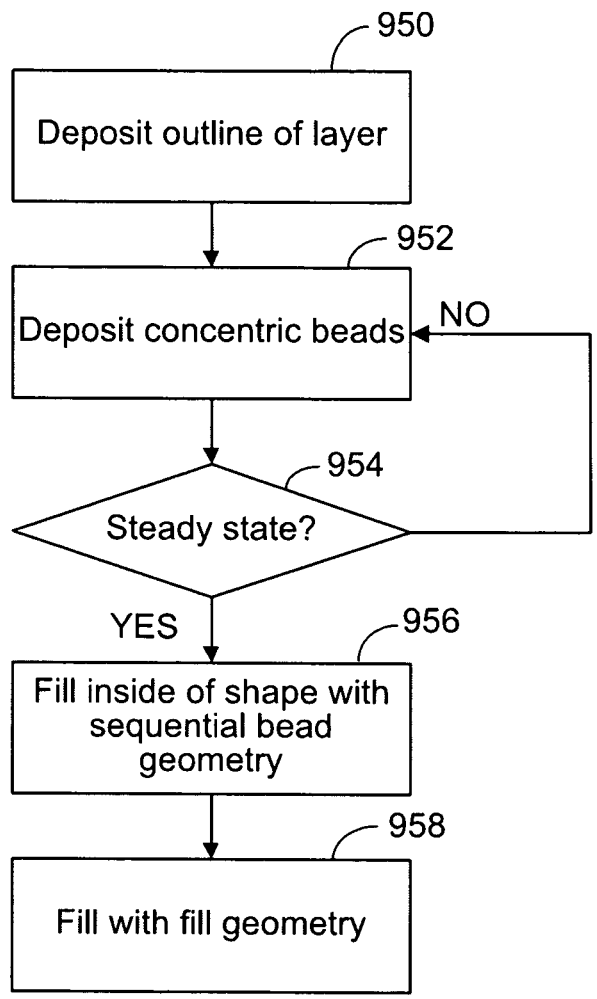
FIG. 19 is a flowchart of a process for depositing a three-dimensional feature.

Referring to FIG. 19, one or more of the steady-state geometries may be combined to result in the deposition of a single layer of an arbitrary planar shape. The following method assumes that the shape is such that radii in the deposition direction are large and that the geometry is not a thin wall, such that the transient geometries described above do not apply. An outline of the layer is deposited (950) via the free edge geometry. Successive concentric beads are deposited (952), still as part of the free edge geometry, moving inwards from the free edge until a steady-state has been achieved (954). When steady-state is reached, the sequential bead geometry is applied and the inside of the shape is filled in (956) by a concentric fill path, a raster pattern, or another path. The filling-in operation ends with the fill geometry (958).

Under this deposition procedure, the edges of the resulting part are smooth because the outline of the part is the first feature to be deposited. In addition, no free edges are approached or left by newly deposited beads, thus allowing these transient geometries to be avoided. In certain cases, such as for a thin wall geometry, depositing the outline of the layer may be impractical or impossible, rendering unavoidable the transient problem of approaching or leaving a free edge.

In some cases, shortcuts may be used that speed up P-V process mapping by increasing intuition about a system and/or by decreasing the amount of testing or simulation used in the creation of a process map.

In one example shortcut, the melt pool area may have a limiting upper bound across geometries. Of the geometries described above, the fill geometry (FIG. 12) has the least restricted path for conduction into the substrate. Thus, the fill geometry is generally associated with the highest power, P, for a specified A and V. That is, on a P-V process map that includes multiple geometries (with fixed $\gamma$ and $T_0$), the constant A curves of the fill geometry will be above the constant area curves of the other geometries. This upper bound can be approximated as the case of no added material, so this upper bound is relatively straightforward to map experimentally by causing a heat source to travel across a large plate.

In another example shortcut, the melt pool area may have a practical limiting lower bound. The single pass thin wall geometry with a tall wall has the most restricted path for conduction into the substrate. Thus, the single pass tall wall geometry is generally associated with the lowest P for a specified A and V. That is, on a P-V process map that includes multiple geometries (with fixed $\gamma$ and $T_0$), the constant A curves of the tall single pass thin wall geometry will be below the constant area curves of the other geometries. This geometry can be investigated experimentally by depositing onto the top of a thin plate turned on its edge.

Figure 20:
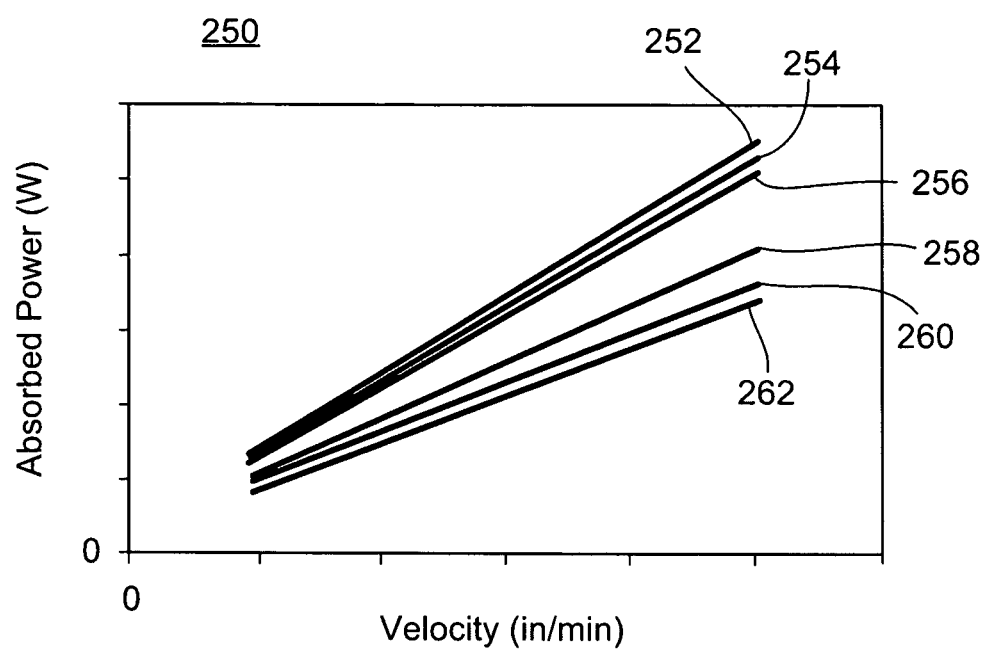
FIG. 20 is a schematic of a P-V process map depicting curves of constant A for various geometries.

Referring to FIG. 20, a process map 250 includes a representation of constant area curves for the fill (252), sequential bead (254), single bead (256), free edge (258), tall multi-pass thin wall (260), and tall single-pass thin wall (262). As discussed above, the fill geometry acts as a limiting upper bound of the constant area curves and the single pass thin wall geometry acts as a limiting lower bound. In some cases, constant L curves for the fill geometry and the single pass thin wall geometry also act as limiting upper and lower bounds, respectively.

In a further example shortcut, generating constant A curves on a P-V process map for the building of a thin wall may cover a wide range of practical P-V behaviors. The first layer of the thin wall is simply the single bead geometry; constant A curves for this first layer will be slightly below the constant A curves for the upper bound fill geometry. Constant A curves for subsequent layers of the thin wall will be lower than the curve for the first layer of the thin wall. The thin tall wall limit yields a lower bound on the constant A curves, as discussed above.

Alternative Embodiments

In general, the techniques described herein can be used to develop AM or direct digital manufacturing processes that involve the feeding of material in wire or powder form into the melt pool. These techniques may also be applied to other AM processes that do not involve the direct feeding of material into the melt pool, such as (but not limited to) powder bed AM processes; and to analogous welding processes if they are being used to build shapes.

The techniques described herein can be applied to a variety of processes involving the formation of a melt pool, such as, e.g., welding processes (even if not used to build a shape).

The dimensions that are mapped do not have to be melt pool dimensions, but can be the dimensions of any part of the thermal field within or surrounding the melt pool. For instance, the geometry of a region bounded by a temperature equal to a value less than the melting temperature may be mapped (i.e., a region larger than the melt pool), providing the ability to control the thermal field surrounding the melt pool. A melt pool itself is not required. For instance, in beam-based surface heat treating processes, in which a beam is rapidly moved across a surface to alter near-surface microstructure without melting, the techniques described herein can be used to map dimensions of the local thermal field (e.g., the geometry of a region bound by a user-specified temperature T*).

These techniques are applicable to various types of heat sources. For instance, welding processes use any of a variety of mechanisms for heating, including, e.g., a metal arc, gas combustion, electrical resistance, friction, and ultrasonics. Other heat sources also fall within the purview of the techniques described herein.

The techniques described herein can be implemented via computational platforms. Various implementations of the techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:
   conducting a plurality of tests of an additive manufacturing process, each test conducted at a different combination of a first process variable and a second process variable for a part having a predetermined structure geometry, each test comprising:
      locally heating a region of the part, wherein the local heating results in formation of a thermal field in the part; and
      assessing a dimension of the thermal field;
   based on results of the plurality of tests, generating a process map of the dimension of the thermal field for a microstructure formation of the part having the predetermined structure geometry as a function of the first process variable, the second process variable, and the predetermined structure geometry; and
   controlling, for the additive manufacturing process, formation of the microstructure formation in the part, the controlling causing the dimension of the thermal field in the part having the predetermined structure geometry to be in accordance with the process map and the first and second process variables.

2. The method of claim 1, wherein locally heating a region of the part includes depositing a single bead of material onto a surface of the part, and wherein the thermal field is a melt pool.

3. The method of claim 2, wherein depositing a single bead of material includes melting a material source with a heat source.

4. The method of claim 1, wherein locally heating a region of the part includes forming a melt pool on the part, and wherein the thermal field is the melt pool.

5. The method of claim 1, wherein the manufacturing process is an additive manufacturing (AM) process.

6. The method of claim 1, wherein the first process variable and the second process variable are selected from the group consisting of a power (P) associated with the manufacturing process, a translation speed (V) associated with the manufacturing process, and either a material feed rate (MFR) used in the manufacturing process or a ratio of deposited to remelted area ($\gamma$).

7. The method of claim 1, wherein the plurality of tests is conducted with at least one process variable other than the first and second process variables held constant.

8. The method of claim 1, wherein the dimension of the thermal field is at least one of a cross-sectional area of a melt pool and a length of the melt pool.

9. The method of claim 1, further comprising specifying an operating range of the manufacturing process, wherein conducting a plurality of tests includes conducting four tests spanning the operating range of the manufacturing process.

10. The method of claim 1, wherein generating a process map includes generating a process map based on a linear interpolation of the thermal field dimension.

11. The method of claim 1, wherein the tests are experimental tests.

12. The method of claim 1, wherein the tests are simulations.

13. The method of claim 1, further comprising conducting an additional test; and adjusting the process map based on the results of the additional test.

14. The method of claim 1, further comprising using the process map to select values of the first and second process variables to yield a selected dimension of a melt pool.

15. The method of claim 1, further comprising generating a plurality of process maps characterizing a process for locally heating a region of another part, each process map corresponding to at least one of a part geometry and a part temperature.

16. The method of claim 1, further comprising decomposing fabrication of another part into a combination of one or more geometries; and
   controlling fabrication of the other part based on the process maps for forming each of the one or more geometries.

17. The method of claim 15, wherein the part geometry includes at least one of a height of the other part and a width of the other part.

18. A Non-transitory computer-readable storage medium storing a computer program including instructions for causing a computer system to:
   receive results from a plurality of tests of a manufacturing process of an additive manufacturing device, each test conducted at a different combination of a first process variable and a second process variable, the results being representative of a dimension of a thermal field formed as a result of locally heating a region of a part having a predetermined structure geometry by the additive manufacturing device;

based on the results, generate a process map of the dimension of the thermal field for a microstructure formation of the part having the predetermined structure geometry as a function of the first process variable and the second process variable for the additive manufacturing device; and generate instructions for controlling the additive manufacturing device to form the microstructure formation in the part by causing the dimension of the thermal field in the part having the predetermined structure geometry to be in accordance with the process map.

19. The computer-readable storage medium of claim 18, wherein locally heating the region of the part includes depositing a single bead of material onto a surface of the part, and wherein the thermal field is a melt pool.

20. The computer-readable storage medium of claim 19, wherein depositing a single bead of material includes melting a material source with a heat source.

21. The computer-readable storage medium of claim 18, wherein locally heating the region of the part includes forming a melt pool on a surface of the part, and wherein the thermal field is the melt pool.

22. The computer-readable storage medium of claim 18, wherein the manufacturing process is an additive manufacturing (AM) process.

23. The computer-readable storage medium of claim 18, wherein the first process variable and the second process variable are selected from the group consisting of a power (P) associated with the manufacturing process, a translation speed (V) associated with the manufacturing process, and either a material feed rate (MFR) used in the manufacturing process or a ratio of deposited to remelted area ($\gamma$).

24. The computer-readable storage medium of claim 18, wherein the plurality of tests is conducted with at least one process variable other than the first and second process variables held constant.

25. The computer-readable storage medium of claim 18, further comprising specifying an operating range of the manufacturing process, wherein conducting a plurality of tests includes conducting four tests spanning the operating range of the manufacturing process.

26. The computer-readable storage medium of claim 18, wherein generating a process map includes generating a process map based on a linear interpolation of the thermal field dimension.

27. The computer-readable storage medium of claim 18, further comprising conducting an additional test; and adjusting the process map based on the results of the additional test.

28. The computer-readable storage medium of claim 18, further comprising using the process map to select values of the first and second process variables to yield a selected dimension of a melt pool.

29. The computer-readable storage medium of claim 18, further comprising generating a plurality of process maps characterizing a process for locally heating a region of another part, each process map corresponding to at least one of a part geometry and a part temperature.

30. The computer-readable storage medium of claim 18, further comprising decomposing the fabrication of another part into a combination of one or more geometries; and controlling fabrication of the other part based on the process maps for forming each of the one or more geometries.

\* \* \* \* \*

UNITED STATES PATENT AND TRADEMARK OFFICE
CERTIFICATE OF CORRECTION

PATENT NO.         : 9,933,255 B2
APPLICATION NO.    : 14/235664
DATED              : April 3, 2018
INVENTOR(S)        : Jack Lee Beuth, Jr.

Page 1 of 1

It is certified that error appears in the above-identified patent and that said Letters Patent is hereby corrected as shown below:

Column 16, Line 57, Claim 18, delete "Non" and insert --non--

Signed and Sealed this
Third Day of July, 2018

Andrei Iancu
*Director of the United States Patent and Trademark Office*